United States Patent
Moshavi

(10) Patent No.: US 7,564,919 B2
(45) Date of Patent: Jul. 21, 2009

(54) WIRELESS COMMUNICATIONS WITH AUXILIARY ANTENNAS

(76) Inventor: Shimon Moshavi, Hashoshan St. 14A, Bet Shemesh (IL) 99590

(*) Notice: Subject to any disclaimer, the term of this patent is extended or adjusted under 35 U.S.C. 154(b) by 565 days.

(21) Appl. No.: 11/394,994

(22) Filed: Mar. 30, 2006

(65) Prior Publication Data
US 2007/0230539 A1   Oct. 4, 2007

(51) Int. Cl.
*H04L 27/00* (2006.01)
(52) U.S. Cl. .......................... 375/295; 375/267
(58) Field of Classification Search .............. 375/295, 375/267, 299
See application file for complete search history.

(56) References Cited

U.S. PATENT DOCUMENTS

| | | | |
|---|---|---|---|
| 2003/0054788 A1* | 3/2003 | Sugar et al. | 455/323 |
| 2004/0204076 A1* | 10/2004 | Kotzin | 455/557 |
| 2006/0212938 A1* | 9/2006 | Suzuki | 726/16 |
| 2007/0025463 A1* | 2/2007 | Aldana | 375/267 |

* cited by examiner

*Primary Examiner*—Kevin Y Kim

(57) ABSTRACT

An auxiliary antenna device includes a baseband interface circuit to communicate with a wireless communications device. The wireless communications device and auxiliary antenna device exchange digital baseband data, and the auxiliary antenna device may augment or complement RF circuitry and antennas in the wireless communications device.

12 Claims, 4 Drawing Sheets

WIRELESS COMMUNICATIONS WITH AUXILIARY ANTENNAS

FIELD

The present invention relates generally to wireless communications devices, and more specifically to the use of multiple antennas with wireless communications devices.

BACKGROUND

Wireless communications devices are becoming ubiquitous because of their usefulness, convenience, and portability. It is well known that increased transmit power and multiple antennas may increase data rates and coverage ranges for wireless communications devices. A typical wireless communications device (e.g., a cellular telephone), however, is typically limited in the number of antennas it can support due to size and cost considerations. For example, many small handheld cellular telephones available today include a single antenna either molded within, or retractable within, the form factor of the cellular telephone.

DESCRIPTION OF EMBODIMENTS

Figure 1:
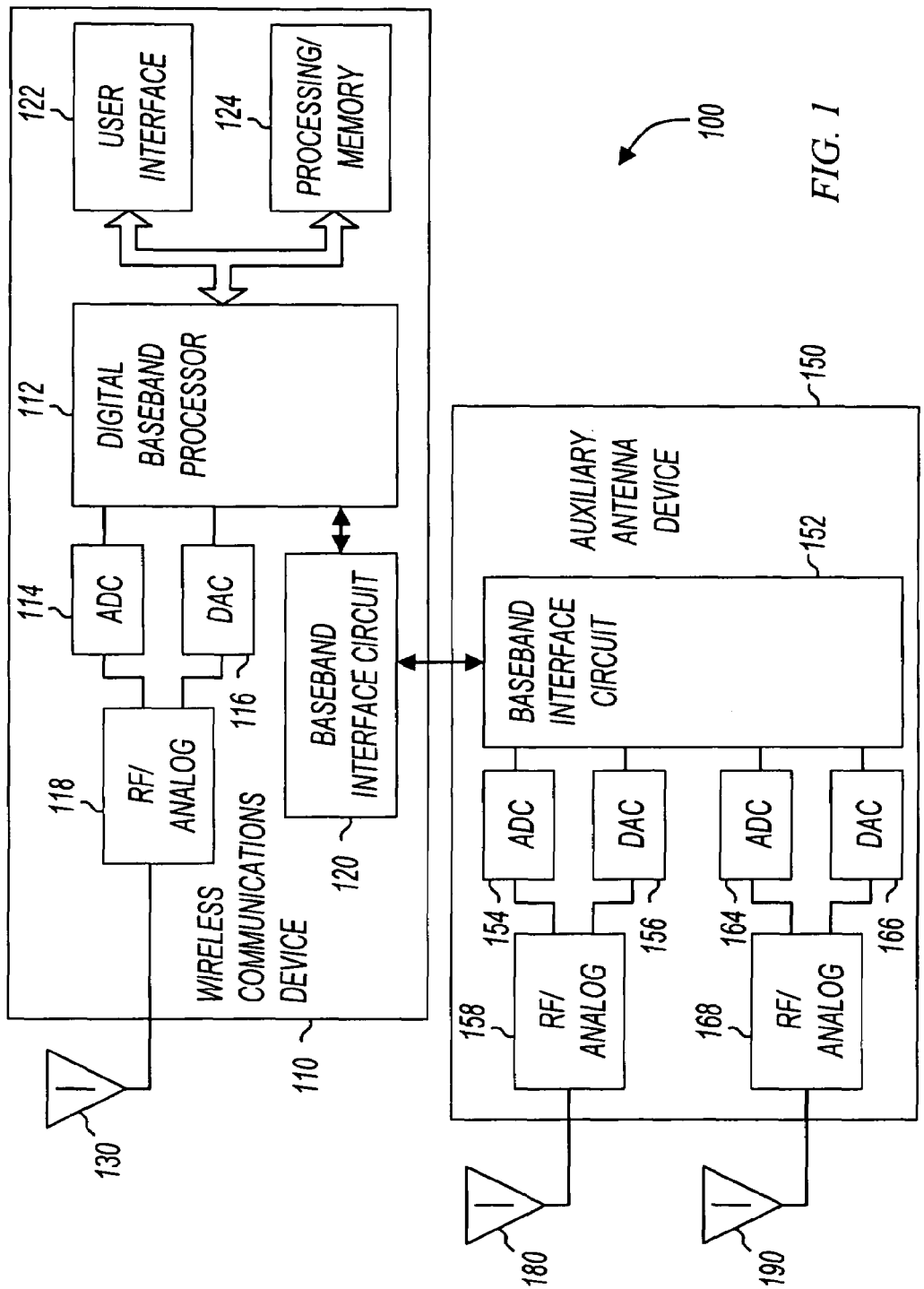
FIG. 1 shows a system including a wireless communications device and an auxiliary antenna device.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of a system including a wireless communications device and an auxiliary antenna device. System 100 includes wireless communications device 110, auxiliary antenna device 150, and antennas 130, 180, and 190. Wireless communications device 110 may be any type of wireless communications device capable of communicating using antenna 130. For example, wireless communications device 110 may be a handheld device such as a cellular telephone or personal digital assistant (PDA). Auxiliary antenna device 150 communicates with wireless communications device 110 to provide wireless communications device 110 with additional communications capability. Wireless communications devices and auxiliary antenna devices are described further below.

Wireless communications device 110 includes user interface 122, processing/memory circuits 124, digital baseband processor 112, analog-to-digital converter (ADC) 114, digital-to-analog converter (DAC) 116, radio frequency (RF) and analog circuits 118, and baseband interface circuit 120. Antenna 130 is coupled to RF/analog circuits 118. Antenna 130 is shown external to wireless communications device 110, although this is not a limitation of the present invention. For example, antenna 130 may be a built-in antenna contained wholly within wireless communications device 110.

User interface 122 may include a keypad, display, speaker, microphone and the like. Processing/memory circuits 124 may include any combination of control circuitry and memory to support the operation of wireless communications device 110. For example, processing/memory 124 may include any combination of microprocessor, microcontroller, static memory, dynamic memory, nonvolatile memory, volatile memory, and the like. The memory may hold program instructions for various method embodiments of the present invention.

Digital baseband processor 112 communicates with user interface 122 and processing/memory circuits 124 to effect communications. For example, digital baseband processor 112 may receive voice signals from user interface 122 and/or processing/memory circuits 124, and produce digital baseband signals. The digital baseband signals may then be sent to DAC 116 and/or baseband interface circuit 120 for further processing. Digital baseband processor 112 is not limited to processing voice signals. For example, in some embodiments, digital baseband processor 112 receives data signals from processing/memory circuits 124. Further, in some embodiments, wireless communications device 110 includes an interface to couple the wireless communications device to another source of data, such as a laptop computer. When coupled with another source of data, wireless communications device 110 may operate as a wireless modem.

RF/analog circuits 118 may include any type of radio frequency and analog circuits. For example, RF/analog circuits 118 may include a receive chain having a low noise amplifier (LNA), filtering, frequency down-conversion, demodulation, and the like. Also for example, RF/analog circuits 118 may include a transmit chain having modulation, frequency up-conversion, power amplification, and the like. In general, RF/analog circuits 118 may perform any physical layer (PHY) function corresponding to of any type of communications protocol. As used herein, the term "protocol" refers to a combination of physical layer technology and frequency band. For example, RF/analog circuits 118 may implement physical layer technologies to transmit and receive radio frequency signals such as time division multiplexing (TDM) signals, frequency division multiplexing (FDM) signals, direct sequence spread spectrum (DSSS) signals, frequency hopping spread spectrum (FHSS) signals, orthogonal frequency division multiplexing (OFDM) signals, and the like. Also for example, RF/analog circuits 118 may implement physical layer technologies to communicate using code division multiple access (CDMA) signals, global system for mobile communications (GSM), or any other cellular telephony standards. Within any of these standards, RF/analog circuits 118 may also transmit and receive in various frequency bands.

When wireless communications device 110 is transmitting signals using antenna 130, digital-to-analog converter 116 receives digital baseband data from digital baseband processor 112 and provides analog signals to RF/analog circuits 118. Likewise, when wireless communications device 110 is receiving signals using antenna 130, RF/analog circuits 118 provides analog signals to ADC 114, which in turn provides digital baseband data to digital baseband processor 112.

Baseband interface circuit 120 provides an interface between digital baseband processor 112 and a device external to wireless communications device 110. For example, baseband interface circuit 120 may receive digital baseband data from digital baseband processor 112, and provide that digital baseband data to auxiliary antenna device 150. Also for example, baseband interface circuit 120 may receive digital baseband data from auxiliary antenna device 150, and provide that digital baseband data to digital baseband processor 112. In some embodiments, baseband interface circuit 120 provides a wired or cabled interface to provide a wired connection between wireless communications device 110 and auxiliary antenna device 150. In other embodiments, baseband interface circuit 120 provides a wireless interface to provide a wireless connection between wireless communications device 110 and auxiliary antenna device 150. Example wireless interfaces may include, but are not limited to, personal are network interfaces such as IEEE 802.15.3 (ultra-wideband (UWB)) interfaces, IEEE 802.15.1 (Bluetooth) interfaces, and wireless network interfaces such as IEEE 802.11 (WiFi) or 802.16 (WiMax) compatible network interfaces.

For example, baseband interface circuit 120 may operate partially in compliance with a personal area network standard such as IEEE Std. 802.15.3-2003, although this is not a limitation of the present invention. As used herein, the term "802.15.3" refers to any past, present, or future IEEE 802.15.3 standard, including, but not limited to, the 2003 edition.

Also for example, baseband interface circuit 120 may operate partially in compliance with a personal area network standard such as IEEE Std. 802.15.1-2002, published Jun. 14, 2002, although this is not a limitation of the present invention. As used herein, the term "802.15.1" refers to any past, present, or future IEEE 802.15.1 standard, including, but not limited to, the 2002 edition.

Also for example, baseband interface circuit 120 may operate partially in compliance with a local area network standard such as IEEE Std. 802.11, 1999 Edition, although this is not a limitation of the present invention. As used herein, the term "802.11" refers to any past, present, or future IEEE 802.11 standard, including, but not limited to, the 1999 edition.

Also for example, baseband interface circuit 120 may operate in compliance with a wireless metropolitan area network standard such as IEEE Std. 802.16-2004, published Oct. 1, 2004, although this is not a limitation of the present invention. As used herein, the term "802.16" refers to any past, present, or future IEEE 802.16 standard, or extension thereto, including, but not limited to, the 2004 edition.

Also for example, baseband interface circuit 120 may operate in compliance with a future IEEE standard such as IEEE 802.20, which is in development to provide a wide area network high-data-rate mobile standard based on OFDM.

Auxiliary antenna device 150 includes baseband interface circuit 152, ADC 154, DAC 156, RF/analog circuits 158, ADC 164, DAC 166, and RF/analog circuits 168. Further, antenna 180 is coupled to RF/analog circuits 158, and antenna 190 is coupled to RF/analog circuits 168. Baseband interface circuit 152 provides an interface to exchange digital baseband data between auxiliary antenna device 150 and wireless communications device 110. Baseband interface circuit 152 may be a wired interface or wireless interface.

In operation, when transmitting, baseband interface circuit 152 receives digital baseband data from wireless communications device 110 and provides the digital baseband data to one or both of DAC 156 and DAC 166. DAC 156 provides analog signals to RF/analog circuits 158, and DAC 166 provides analog signals to RF/analog circuits 168. When receiving, RF/analog circuits 158 receives RF signals from antenna 180, and provides analog signals to ADC 154. Further, RF/analog circuits 168 receives RF signals from antenna 190, and provides analog signals to ADC 164. ADC 154 and ADC 164 provide digital baseband data to baseband interface circuit 152 for transmission to wireless communications device 110.

As shown in FIG. 1, auxiliary antenna device 150 provides antennas, RF circuits, analog circuits, and digital circuits that may be utilized by a wireless communications device that is external to auxiliary antenna device 150. In some embodiments, auxiliary antenna device 150 may have a larger power supply than wireless communications device 110, and may extend the effective communications range of wireless communications device 110. For example, in some embodiments, wireless communications device 110 may be a cellular telephone with a relatively small battery, and auxiliary antenna device 150 may have a larger battery. Also for example, in some embodiments, wireless communications device 110 may be a cellular telephone with a battery, and auxiliary antenna device 150 may plug into a power receptacle, effectively providing an infinite battery life.

Auxiliary antenna device 150 is shown having two RF/analog circuits, but this is not a limitation of the present invention. For example, in some embodiments, auxiliary antenna device 150 may have fewer than two RF/analog circuits, or more than two RF/analog circuits. Further, auxiliary antenna device 150 may have any number of antennas coupled thereto.

In some embodiments, wireless communications device 110 is integrated to work in tandem with the circuitry included in the external antenna device 150. For example, the wireless communications device may include two antennas along with the associated RF/analog circuits, but may support four antenna receive/transmit processing at digital baseband. In these embodiments, the two antennas of the wireless communications device may be augmented by an additional two antennas from the auxiliary antenna device.

In some embodiments, auxiliary antenna device 150 provides more of the same capabilities that already exist in wireless communications device 110. For example, auxiliary antenna device 150 may communicate on the same type of cellular telephone network as does wireless communications device 110. In these embodiments, auxiliary antenna device 150 may provide increased range, additional beamforming by virtue of an increased number of antennas, and the like.

Auxiliary antenna device 150 may extend the capabilities of wireless communications device 110 by providing the ability to communicate using different protocols. In some embodiments, auxiliary antenna device 150 may use a different protocol by implementing a different cellular telephony standard, operating in a different frequency band, or both. For example, wireless communications device 110 may be a cellular telephone with baseband circuitry that can support multiple standards such GSM and CDMA, while RF/analog circuits 118 may only support GSM. In these embodiments, auxiliary antenna device 150 may provide the ability to connect to a CDMA cellular telephone network. Also for example, wireless communications device 110 may be a GSM cellular telephone operating in a first frequency band, and auxiliary antenna device may provide GSM connectivity in a different frequency band. Further, in some embodiments, multiple auxiliary antenna devices 150 may be coupled to wireless communications device 110, each providing different communications capabilities. In some embodiments, users wishing to expand the number of frequency bands supported may purchase an auxiliary antenna device without having to replace the wireless communications device.

In some embodiments, wireless communications device 110 may be able to sense whether it is coupled to an auxiliary antenna device, and react accordingly. For example, processing/memory circuits 124 may receive information originating from baseband interface circuit 120 signifying that auxiliary antenna device 150 is coupled thereto. In response, processing/memory circuits 124 may modify the operation of digital baseband processor 112 to utilize one or more data channels in baseband interface circuit 120 for communications.

In some embodiments, the auxiliary antenna device may only be accessed when needed, even if continuously coupled to the wireless communications device. For example, it may be determined that the auxiliary antenna device is only needed when higher throughput is desired or extended range is desired.

In some embodiments, RF/analog circuits 118, ADC 114, and DAC 116 are omitted from wireless communications device 110. In these embodiments, auxiliary antenna device 150 is used to obtain all digital baseband samples to be processed by the digital baseband processor 112. For example, wireless communications device 110 may support one or more cellular telephony standards in digital baseband, but may have no RF front ends supporting them; and instead it may rely on an interface circuit, which could use a different wireless standard such as UWB, and auxiliary antenna device to bring in the digital baseband samples needed for the cellular telephone digital baseband processing (e.g. GSM, CDMA, etc). A wireless communication device in this configuration may have an RF front end and antenna for the baseband interface circuit in order to transmit/receive the digital baseband samples, although this is not required. For example, the wireless communications device and auxiliary antenna device may be tethered via wires or a cable.

Auxiliary antenna devices may have many uses. For example, an auxiliary antenna device may be stored in a vehicle. When a user enters the vehicle, the user's wireless communications device may detect the auxiliary antenna device. Further, an auxiliary antenna device may be portable, and may be conveniently carried in a briefcase, backpack, or by any other means.

Figure 2:
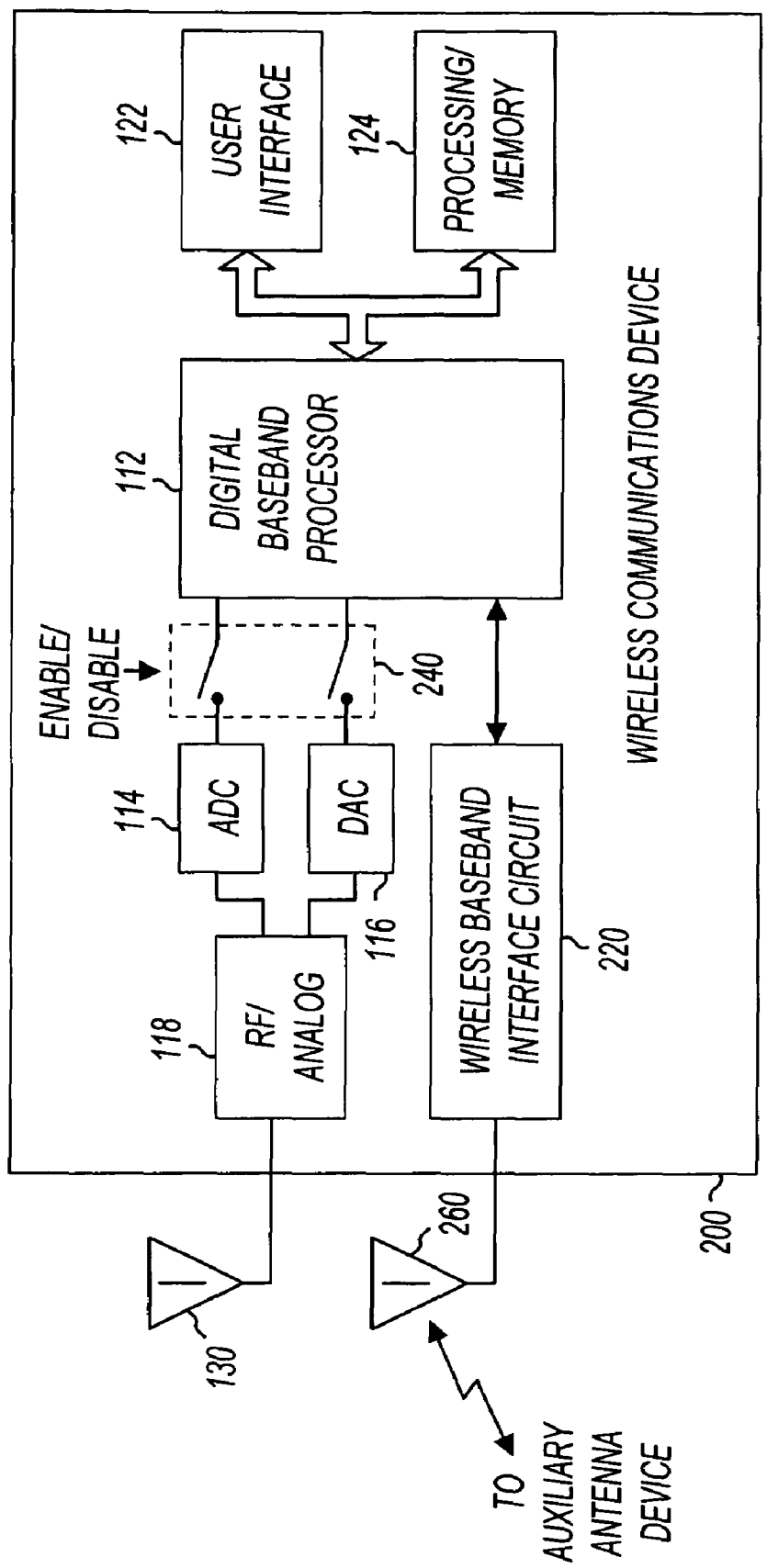
FIG. 2 shows a wireless communications device in accordance with various embodiments of the present invention.

FIG. 2 shows a wireless communications device in accordance with various embodiments of the present invention. Wireless communications device 200 includes digital baseband processor 112, ADC 114, DAC 116, and RF/analog circuits 118, all of which are described above with reference to FIG. 1. Wireless communications device 200 also includes wireless baseband interface circuit 220 and switches 240.

Wireless baseband interface circuit 220 is coupled between digital baseband processor 112 and antenna 260. In some embodiments, wireless baseband interface circuit 220 transmits digital baseband data to, and receives digital baseband data from, an auxiliary antenna device such as auxiliary antenna device 150 (FIG. 1). Further, in some embodiments, wireless baseband interface circuit 220 may implement a broadband wireless protocol such as ultra-wideband (UWB).

Switches 240 are circuits that enable or disable the operation of RF circuits in wireless communication device 200. In some embodiments, when wireless baseband interface circuit 220 is communicating with an auxiliary antenna device, switches 240 are opened. In these embodiments, an auxiliary antenna device may be utilized in place of RF circuits and antennas within the wireless communications device.

In some embodiments, the function of switches 240 is provided by other circuits within wireless communications device 200. For example, power to RF/analog circuits 118 may be turned off, or the gain of the final power amplifier may be significantly reduced. The operation of circuits within wireless communications device 200 may be modified in any manner without departing from the scope of the present invention.

Figure 3:
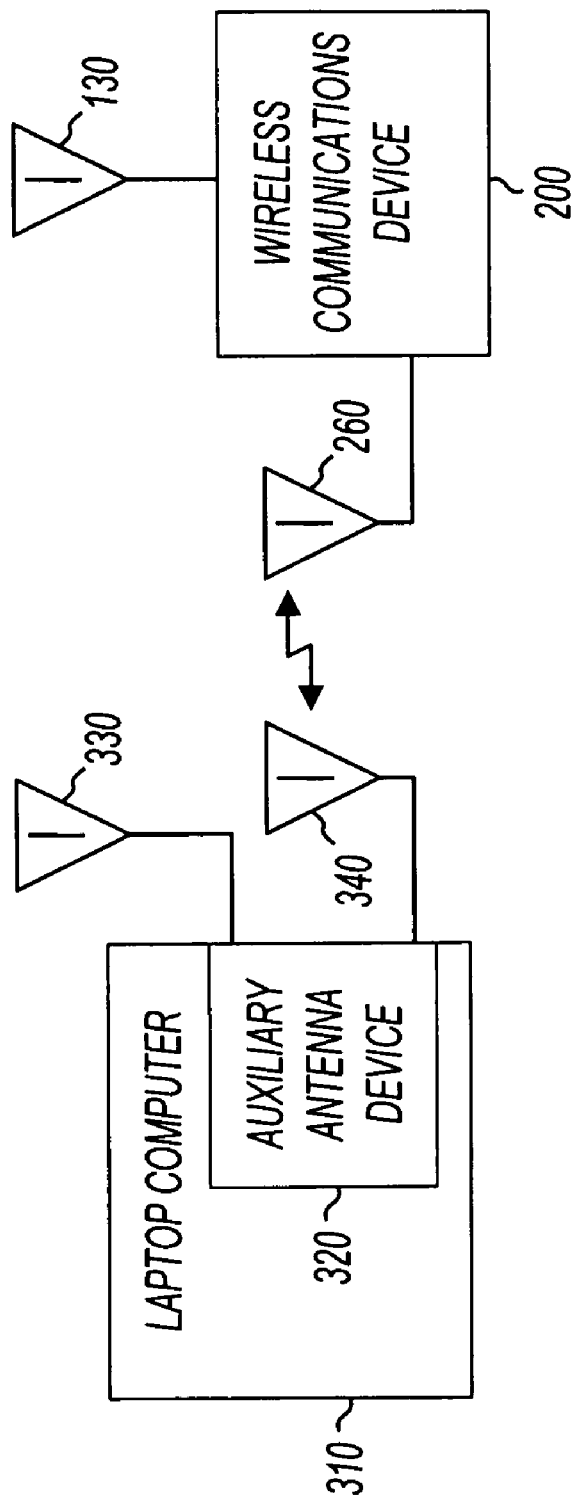
FIG. 3 shows a wireless communications device and a laptop computer having an auxiliary antenna device.

FIG. 3 shows a wireless communications device and a laptop computer having an auxiliary antenna device. Wireless communications device 200 is described above with reference to FIG. 2. Laptop computer 310 may be any type of device, and is shown in FIG. 3 as an example of a mobile device that may incorporate an auxiliary antenna device. As shown in FIG. 3, laptop computer 310 includes auxiliary antenna device 320.

Auxiliary antenna device 320 may be an auxiliary antenna device similar to auxiliary antenna device 150 (FIG. 1) with a wireless baseband interface circuit. In these embodiments, antenna 330 may be coupled to an RF/analog circuits such as RF/analog circuits 158 (FIG. 1) and antenna 340 may be coupled to a wireless baseband interface circuit. Further, auxiliary antenna device 320 may occupy a slot such as a PCM-CIA slot in laptop computer 310. Further, auxiliary antenna device 320 maybe coupled to laptop computer 310 using a port such as a USB port. The manner in which auxiliary antenna device 320 is coupled to laptop computer 310 is not a limitation of the present invention.

In some embodiments, auxiliary antenna device 320 draws power from laptop computer 310. In these embodiments, auxiliary antenna device 320 may be able to provide extended range or other extended capabilities to wireless communications device 200.

Figure 4:
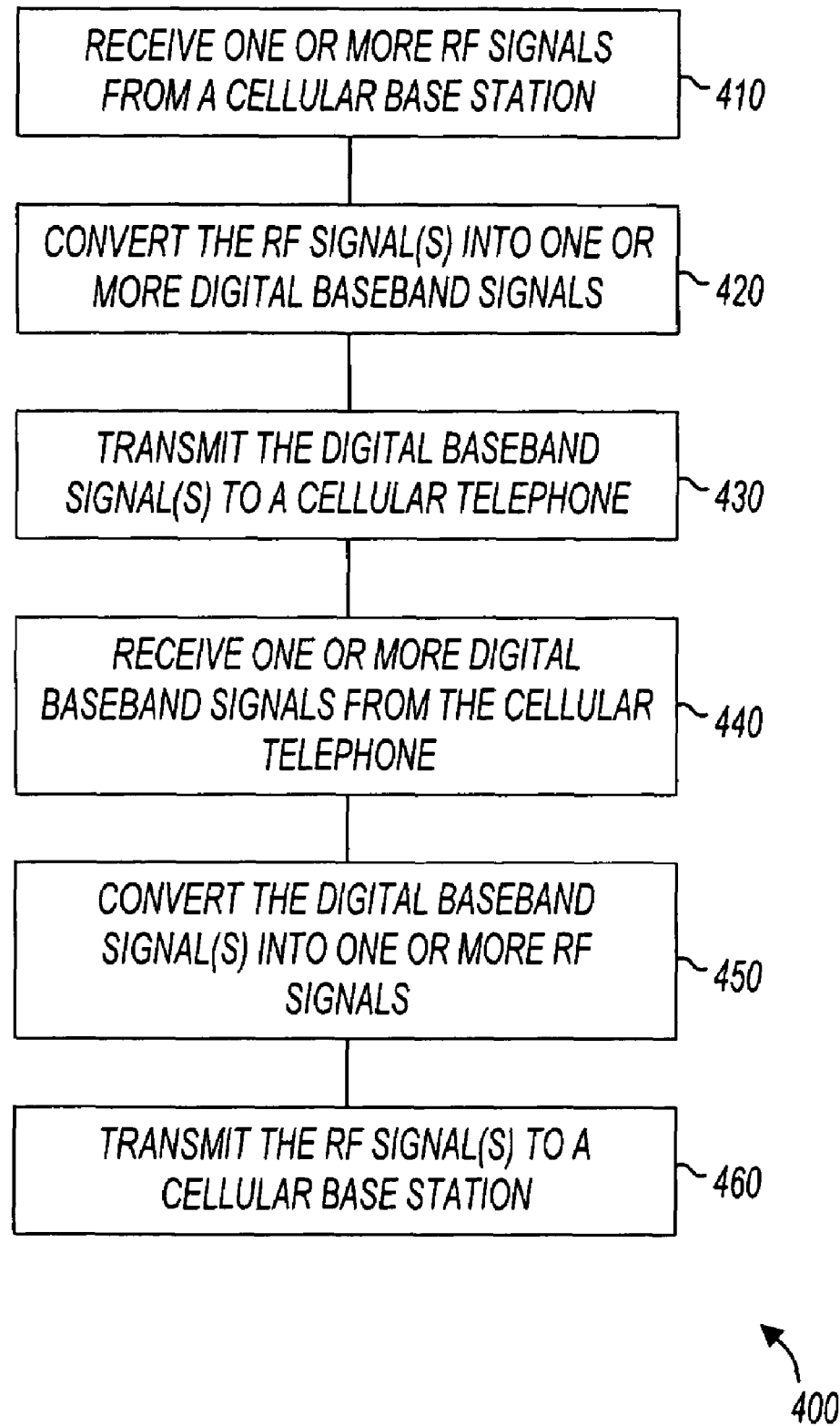
FIG. 4 shows a flowchart in accordance with various embodiments of the present invention.

FIG. 4 shows a flowchart in accordance with various embodiments of the present invention. In some embodiments, method 400, or portions thereof, may be performed by an auxiliary antenna device as described above, although method 400 is not limited by the particular type of apparatus, software element, or system performing the method. The various actions in method 400 may be performed in the order presented, or may be performed in a different order. Further, in some embodiments, some actions listed in FIG. 4 are omitted from method 400.

Method 400 is shown beginning at block 410 in which one or more signals is received from a cellular base station. In some embodiments, the actions of 410 correspond to auxiliary antenna device 150 (FIG. 1) receiving cellular telephone signals at either or both of antennas 180 and 190. At 420, the one or more RF signals are converted into one or more digital baseband signals. This may correspond to RF circuits modulating and down converting the received signals, and analog-to-digital converter circuits digitizing the result.

At 430, the digital baseband signals are transmitted to a cellular telephone. In some embodiments, this corresponds to baseband interface circuit 152 (FIG. 1) transmitting digital baseband data to wireless communications device 110.

At 440, one or more digital baseband signals are received from the cellular telephone. At 450, the digital baseband signals are converted into one or more RF signals, and at 460, RF signals are transmitted to a cellular base station.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A wireless communications device comprising:
a digital baseband processing circuit to produce a plurality of baseband signals;
a baseband interface circuit to transmit at least one of the baseband signals off of the wireless communications device;
a radio frequency circuit coupled to the digital baseband processing circuit to produce a radio frequency signal;
an antenna coupled to the radio frequency circuit to transmit the radio frequency signal; and
circuitry to turn off transmission of the radio frequency signal when the baseband interface circuit is operating;
wherein the wireless communications device comprises a cellular telephone.

2. The wireless communications device of claim 1 wherein the baseband interface circuit is a wired interface circuit.

3. The wireless communications device of claim 1 wherein the baseband interface circuit is a wireless interface circuit.

4. The wireless communications device of claim 3 wherein the wireless interface circuit comprises an ultra-wideband (UWB) circuit.

5. A system comprising:
a cellular telephone supporting a first cellular telephony protocol, the cellular telephone having a digital baseband processing circuit to produce a plurality of baseband signals, a baseband interface circuit to transmit and receive the plurality of baseband signals, a radio frequency circuit coupled to the digital baseband processing circuit to produce a radio frequency signal, an antenna coupled to the radio frequency circuit to transmit the radio frequency signal, and circuitry to turn off transmission of the radio frequency signal when the baseband interface circuit is operating; and
an auxiliary antenna device to communicate with the baseband interface circuit of the cellular telephone, wherein the auxiliary antenna device includes radio frequency circuitry supporting a second cellular telephony protocol, and at least one antenna.

6. The system of claim 5 wherein the cellular telephone operates in compliance with a first cellular telephony standard in a first frequency band.

7. The system of claim 6 wherein the auxiliary antenna device operates in compliance with the first cellular telephony standard in a second frequency band.

8. The system of claim 6 wherein the auxiliary antenna device operates in compliance with a second cellular telephony standard.

9. The system of claim 5 wherein the baseband interface circuit comprises a wired interface circuit.

10. The system of claim 5 wherein the baseband interface circuit comprises a wireless interface circuit.

11. The system of claim 10 wherein the wireless interface circuit comprises an ultra-wideband (UWB) interface circuit.

12. The system of claim 5 wherein the auxiliary antenna device includes a plurality of antennas.

* * * * *